United States Patent Office 3,236,628
Patented Feb. 22, 1966

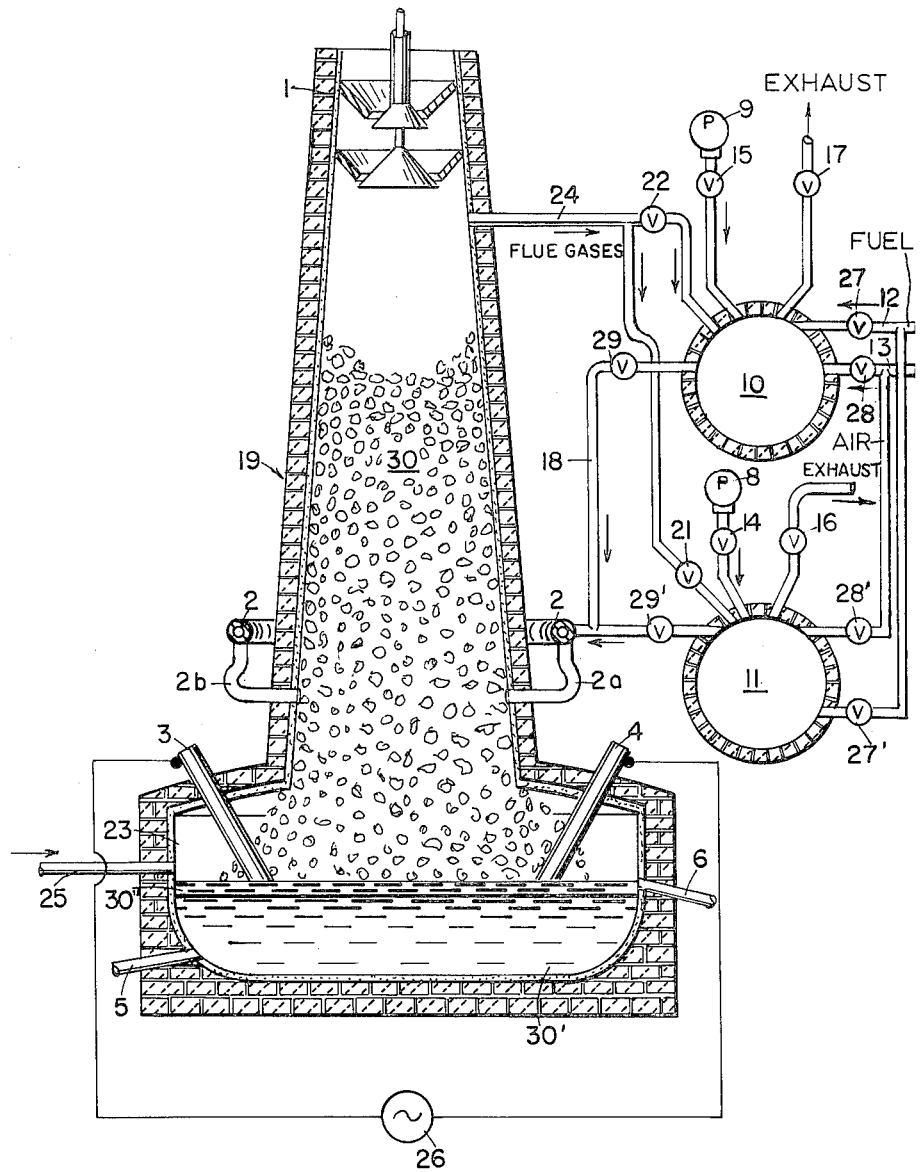

3,236,628
PROCESS AND PLANT FOR PRODUCING
MOLTEN PIG IRON
Ludwig von Bogdandy, Essen-Frintrop, Germany, assignor to Huttenwerk Oberhausen Aktiengesellschaft, Oberhausen, Rhineland, Germany, a corporation of Germany
Filed Dec. 8, 1961, Ser. No. 157,947
Claims priority, application Germany, Dec. 10, 1960, H 41,186
1 Claim. (Cl. 75—42)

My present invention relates to a process for producing molten pig iron from a charge of iron ore and slag-forming flux, as well as to a plant for carrying out the process.

The most economical processes for recovering pig iron from ore involve the use of a vertical furnace into which the ore and the slag formers are introduced from above together with a considerable quantity of coke, while a reducing gas passes upwardly through the charge (i.e. in countercurrent thereto) while the same is being heated to smelting temperatures. Conventional furnaces of this type have a daily output of approximately one ton of pig iron per cubic meter of volume of the furnace chamber.

An object of my present invention is to provide a process and means for realizing similar results in cases where coke or equivalent solid carbonaceous material is not or only sparingly available.

A more particular object of this invention is to provide a process and means for effectively reducing and carbonizing a furnace charge exclusively or principally with the aid of gaseous agents obtainable from such alternate natural resources as petroleum and natural gas.

Prior attempts at utilizing gaseous agents for the purpose stated have failed because the carbon-containing reducing gas tends to decompose at the high temperatures of the smelting zone and to leave a residue of soot which clogs the interstices of the descending charge column and impedes the passage of the gas flow therethrough.

In accordance with my present invention I avoid these difficulties by introducing a hot reducing gas, preferably, a gas consisting essentially of hydrogen and carbon monoxide, into a vertical furnace at an intermediate level while maintaining the temperatures of the charge at and above that level below those required for smelting; thus I have found that the reduction gas is advantageously admitted at temperatures upward of 900° C. but preferably not much higher than 1000° C. At the same time the charge, which has been reduced and carbonized by its contact with the hot gas passing in countercurrent thereto, is allowed to proceed toward a lower region of the furnace chamber which is designed as a crucible and wherein the smelting is effected. The smelting temperatures may be produced by a variety of means, including an electric current from a pair of electrodes immersed in the charge and/or the maintenance of a combustion within the crucible; such combustion may be maintained with the aid of a preferably hot oxidizing stream (e.g. of air, and/or oxygen with the principal addition of water vapor) and may involve a minor proportion of solid carbon (coke) added to the charge and/or a flow of liquid or gaseous hydrocarbons simultaneously admitted into the crucible. The smelting of the charge in the crucible eliminates the residual oxygen and causes the slag to float on a mass of molten iron so that both can be easily separated and drawn off at the lower end of the furnace; at the same time the combustion gases from the crucible rise into the reduction zone thereabove and supplement the action of the reducing and carbonizing gas therein.

The hot gases used in the process of my invention are advantageously obtained by the conversion of methane and/or other gases or liquid hydrocarbons which can be converted almost entirely into hydrogen and carbon monoxide by heating in the presence of an oxidizing agent such as air, oxygen and/or water vapor. A particularly desirable system according to the invention utilizes the sensible and/or latent heat of the waste gases escaping from the furnace flue, preferably with the aid of a pair of regeneratively preheatable reaction chambers into which these waste gases are alternately admitted while the hydrocarbons to be split into hydrogen and carbon monoxide are alternately switched to the reaction chambers previously preheated in this manner. A gas-producing system of this type has been disclosed in commonly assigned application Ser. No. 10,124 filed February 23, 1960 by Heinz-Dieter Pantke and me.

It has been found that a process for reducing and carbonizing a furnace charge in a regenerative system of the type referred to is practically self-sustaining as far as the balance of energy input and output is concerned.

The invention will be described in greater detail with reference to the accompanying drawing whose sole figure shows a somewhat diagrammatical plant for practicing my new process.

The furnace 19 shown in the drawing forms a vertical, upwardly converging chamber for a charge 30, the latter having been introduced from above through an entrance port which in operation is closed by a shutter 1 here shown as of the double-bell type. An annular conduit 2 surrounds the furnace 19 at an intermediate level and is provided at annularly spaced locations with conduits 2a, 2b leading into the furnace chamber. A region of the furnace below the level of inlets 2a, 2b is shaped as a crucible 23 and includes means for heating the charge to smelting temperatures, thereby producing a belt 30' of pig iron and a supernatant layer 30" of liquid slag. The heating means of the crucible 23 are here shown as a pair of electrodes 3 and 4, connected across a source of electric current 26, and by way of alternative or supplement as a pipe 25 to which a combustion promoting agent such as air or oxygen with or without water vapor may be admitted. The fuel consumed in this combustion may include a small admixture of coke added to the charge 30 prior to or after its introduction into the furnace, and/or a stream of gaseous or liquid hydrocarbons simultaneously blown into the crucible 23. Taps 5 and 6 at the bottom of the furnace serve for the esparate removal of the melt 30' and the slag 30", respectively.

A primary hydrocarbon liquid or gas such as methane is supplied via a conduit 12 and is alternately admitted into two reaction chambers 10 and 11 with the aid of a pair of switchover valves 27, 27'; an oxidizing agent such as air, oxygen or water vapor, or a mixture thereof, is concurrently fed through a conduit 13 and switchover valves 28, 28' into the same reaction chamber 10 or 11. These chambers are maintained at temperatures well over 900° C., preferably at approximately 1000° C., and are connected to annular conduit 2 via switchover valves 29, 29' through which the mixture of carbon monoxide and hydrogen produced in the converter 10, 11 is fed into the furnace 19 while being still at a temperature upwards of 900° C.

The reaction chambers 10 and 11 are preferably brick-lined vessels, e.g. as shown in the above-identified Bogdandy-Pantke application, and are regeneratively heated during their "off" periods, i.e. when the associated valves 27–29 or 27'–29' are closed, by the exhaust gases of the furnace which are discharged from a flue 24 and are alternately admitted into the converter chambers 11 and 10 by switchover valves 21 and 22, respectively. Blowers 8 and 9 at the same time deliver combustion air to the chambers 11 and 10, by way of alternately open valves 14 and 15 to enable a utilization not only of the sensible heat of the flue gases but also of the residual latent heat thereof by a combustion of these gases in the converter. The heat so stored in the refractory lining of chambers 10 and 11 is utilized in the next "on" period of the regenerative cycle to split the hydrocarbons entering from conduit 12. Valves 16 and 17 are opened and closed in step with valves 14 and 15 to permit the discharge of the combustion products from the converter chamber.

While the temperature range of 900–1000° C. for the reduction gases entering the furnace at 2a and 2b has been found to be an optimum, even higher temperatures are permissible so long as no melting of the charge occurs at the level of these inlets. Moreover, modifications of the precise structure described and illustrated are possible without departing from the spirit and scope of the invention as defined in the appended claim.

I claim:

A process for producing molten pig iron, in a furnace with a vertical shaft terminating at its bottom in a crucible, from a charge substantially free from carbonaceous material and containing iron ore and a slag-forming flux, comprising the steps of passing said charge downwardly through said vertical shaft into said crucible; producing a reducing gas consisting essentially of carbon monoxide and hydrogen by reacting a fluid hydrocarbon with oxygen; introducing said reducing gas into said shaft at a location along the path of said charge just above said crucible, thereby reducing said iron ore and converting said charge into elemental iron and slag; electrically smelting the reduced iron in said crucible in the presence of, at most, a minor proportion of added solid carbon to produce a melt thereof; and heating said reducing gas externally of said furnace by passing it through a chamber regeneratively heated by exhaust gas from said furnace, thereby raising the temperature of said reducing gas to a level upwards of 900° C. prior to admitting it to said shaft.

References Cited by the Examiner

UNITED STATES PATENTS

| | | | |
|---|---|---|---|
| 1,058,991 | 4/1913 | Lindblad | 75—38 |
| 1,075,295 | 10/1913 | Lyons et al. | 75—10 |
| 1,111,341 | 9/1914 | Wile | 75—10 |
| 1,314,229 | 8/1919 | Washburn | 75—10 X |
| 1,847,527 | 3/1932 | Greene | 75—10 |
| 1,944,874 | 1/1934 | Brassert | 75—41 |
| 2,010,073 | 4/1935 | Frankl | 266—25 |
| 2,066,665 | 1/1937 | Baily | 75—11 |
| 2,087,272 | 7/1937 | Wile | 75—10 |
| 2,420,398 | 5/1947 | Kinney | 75—42 |
| 2,790,711 | 4/1957 | Sellers et al. | 75—41 |
| 2,857,155 | 10/1958 | Dickey | 266—25 |

DAVID L. RECK, *Primary Examiner.*

N. F. MARKVA, W. C. TOWNSEND, H. F. SAITO,
*Assistant Examiners.*